Figure 1:
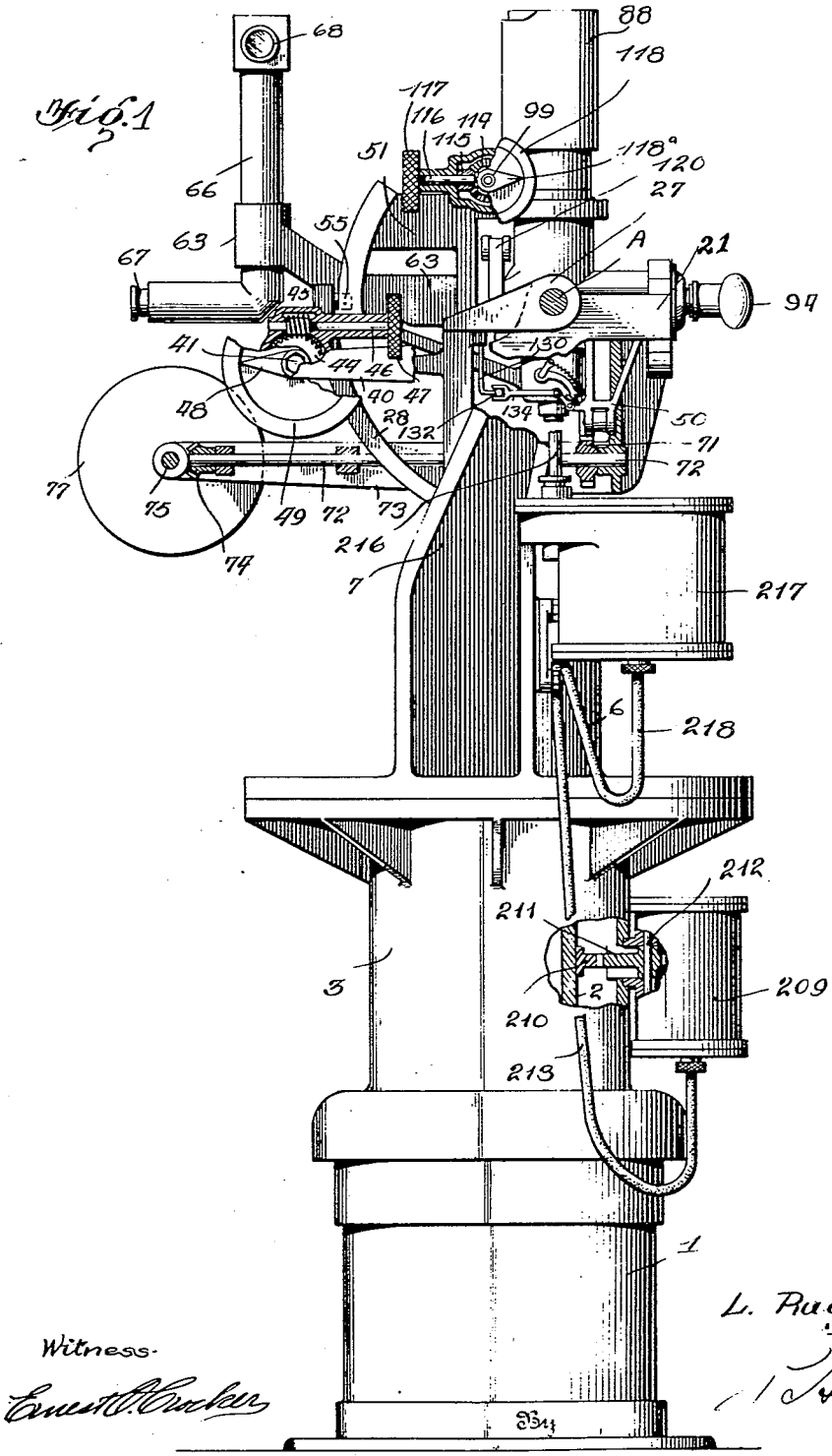
Figure 2:
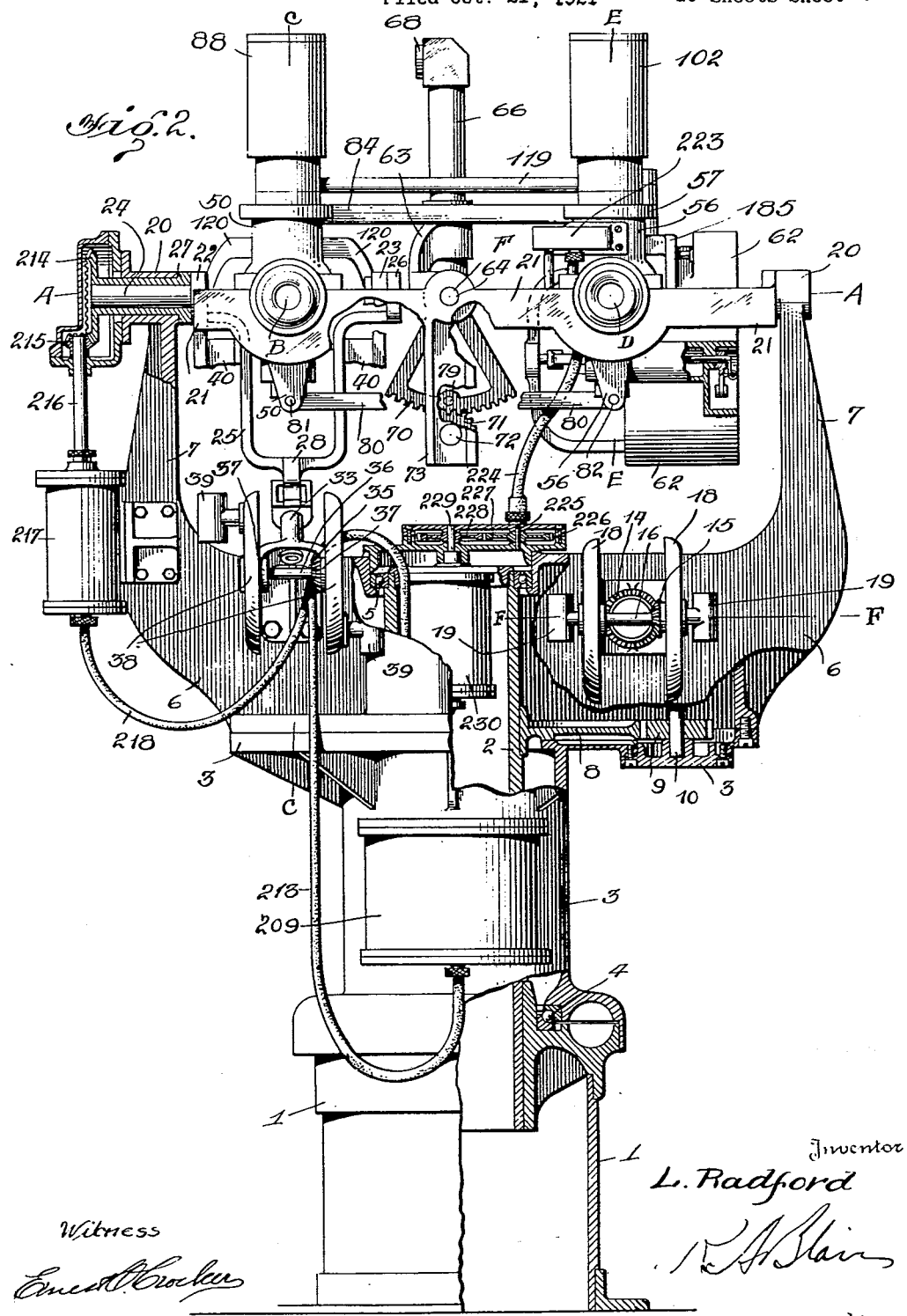
Figure 8:
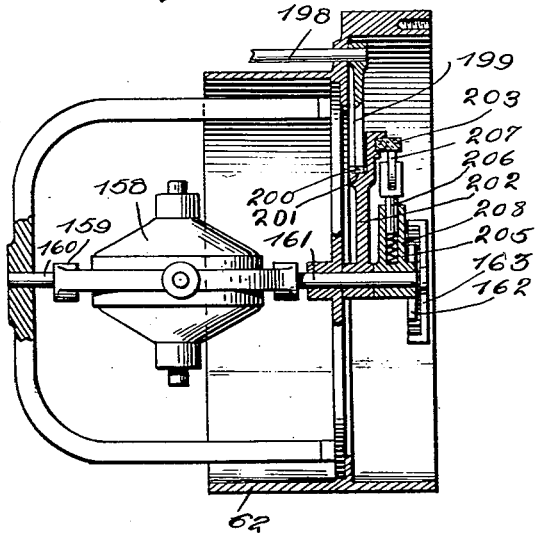
Figure 9:
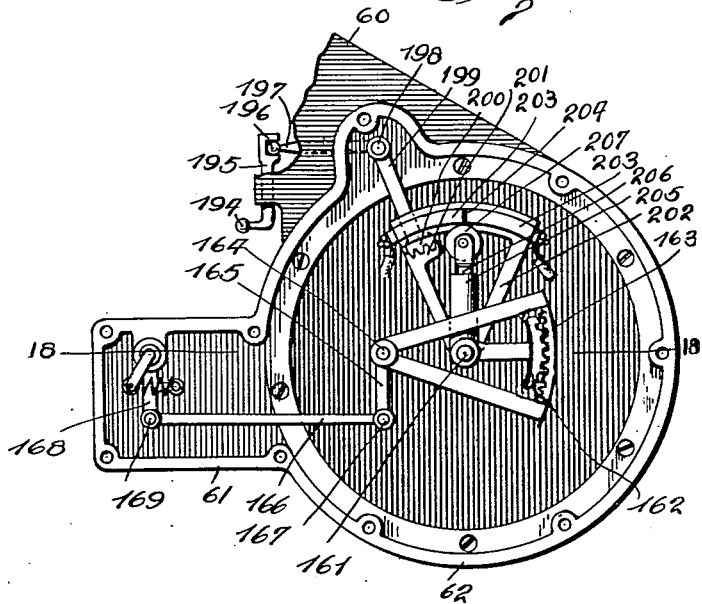

March 24, 1925.
L. RADFORD
FIRE CONTROL
Filed Oct. 21, 1921    10 Sheets-Sheet 1

1,531,132

Witness
Ernest O. Tucker

Inventor
L. Radford
J. A. Blair
Attorney

Figures 3, 18:
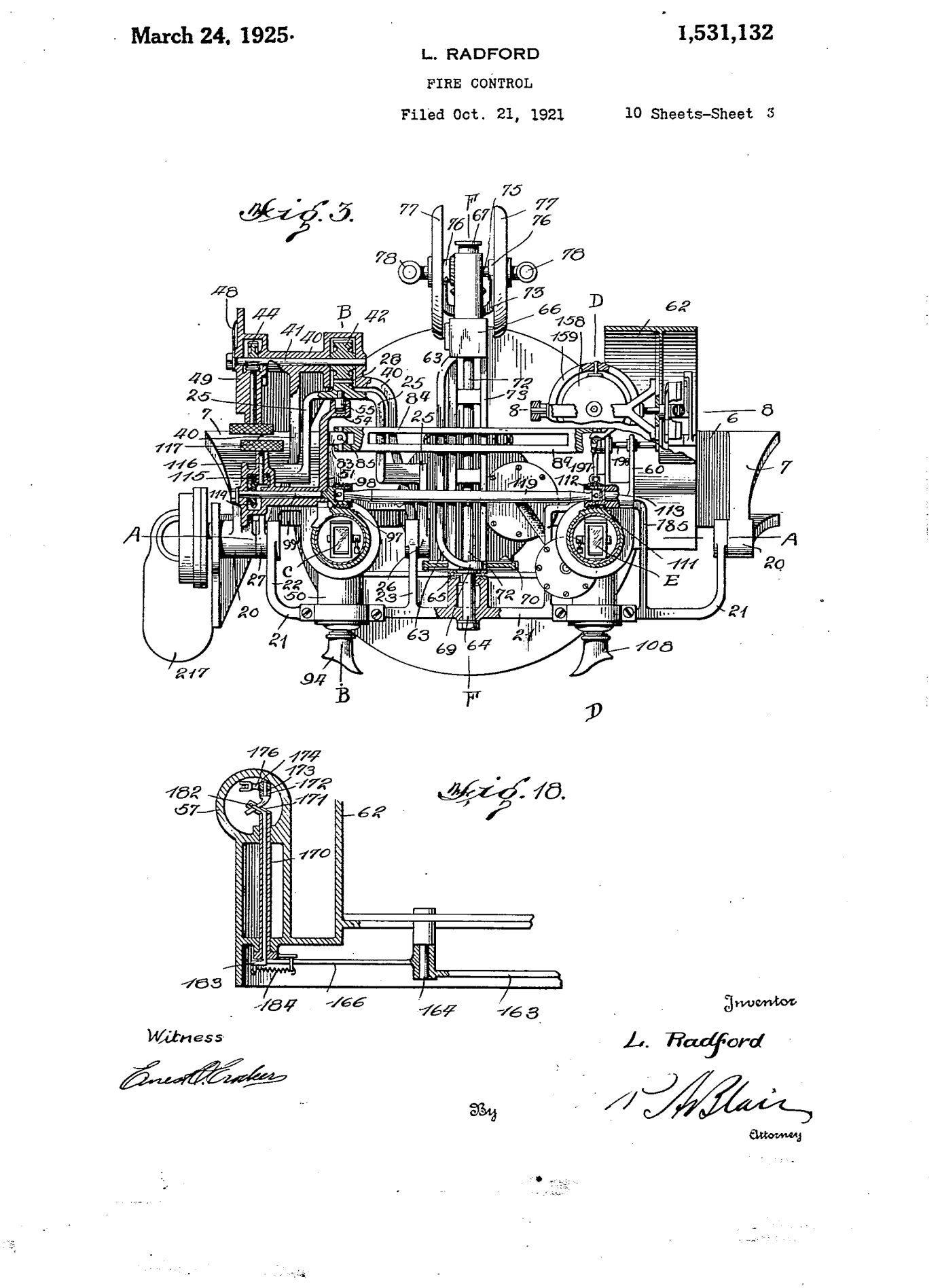

March 24, 1925.

L. RADFORD

FIRE CONTROL

Filed Oct. 21, 1921

Witness

Inventor
L. Radford

By
Attorney

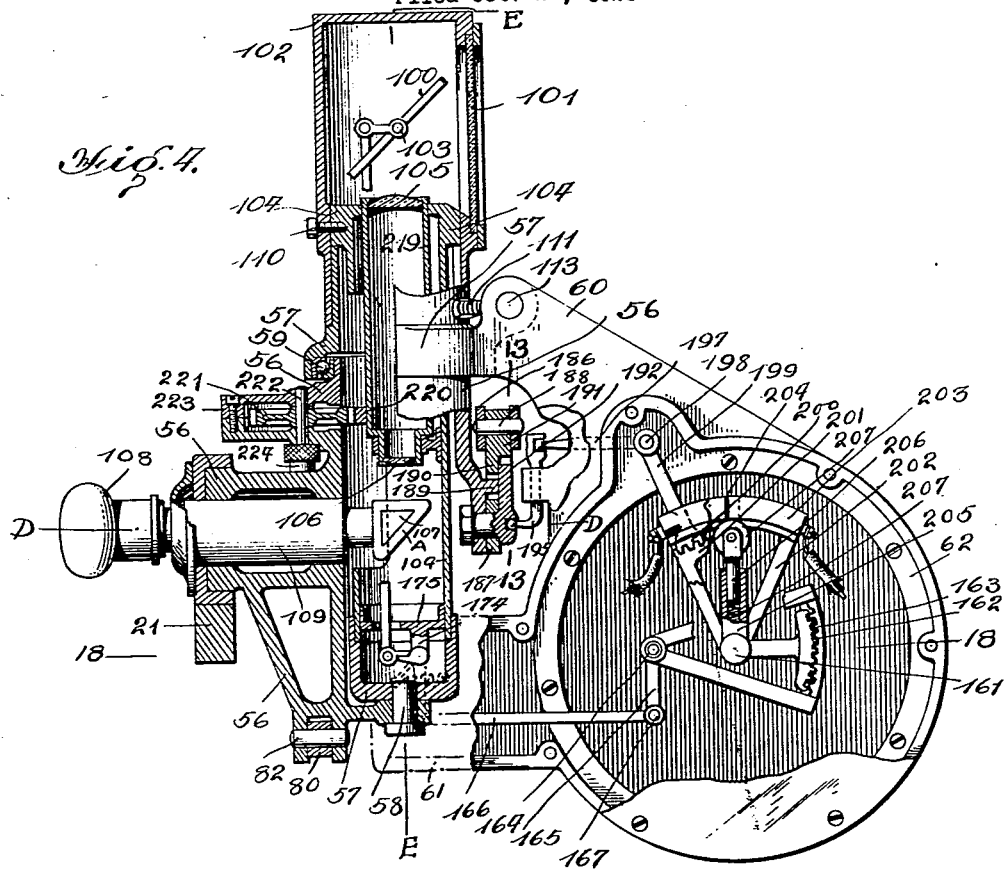
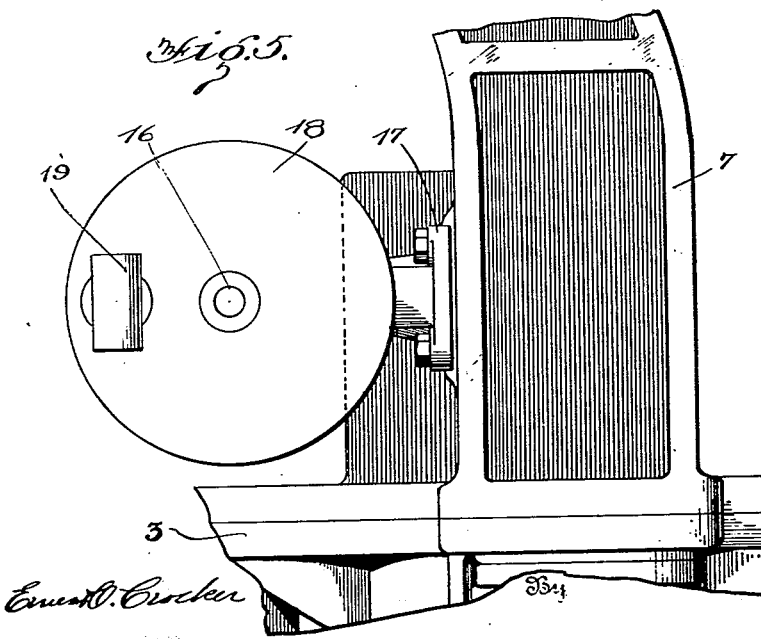

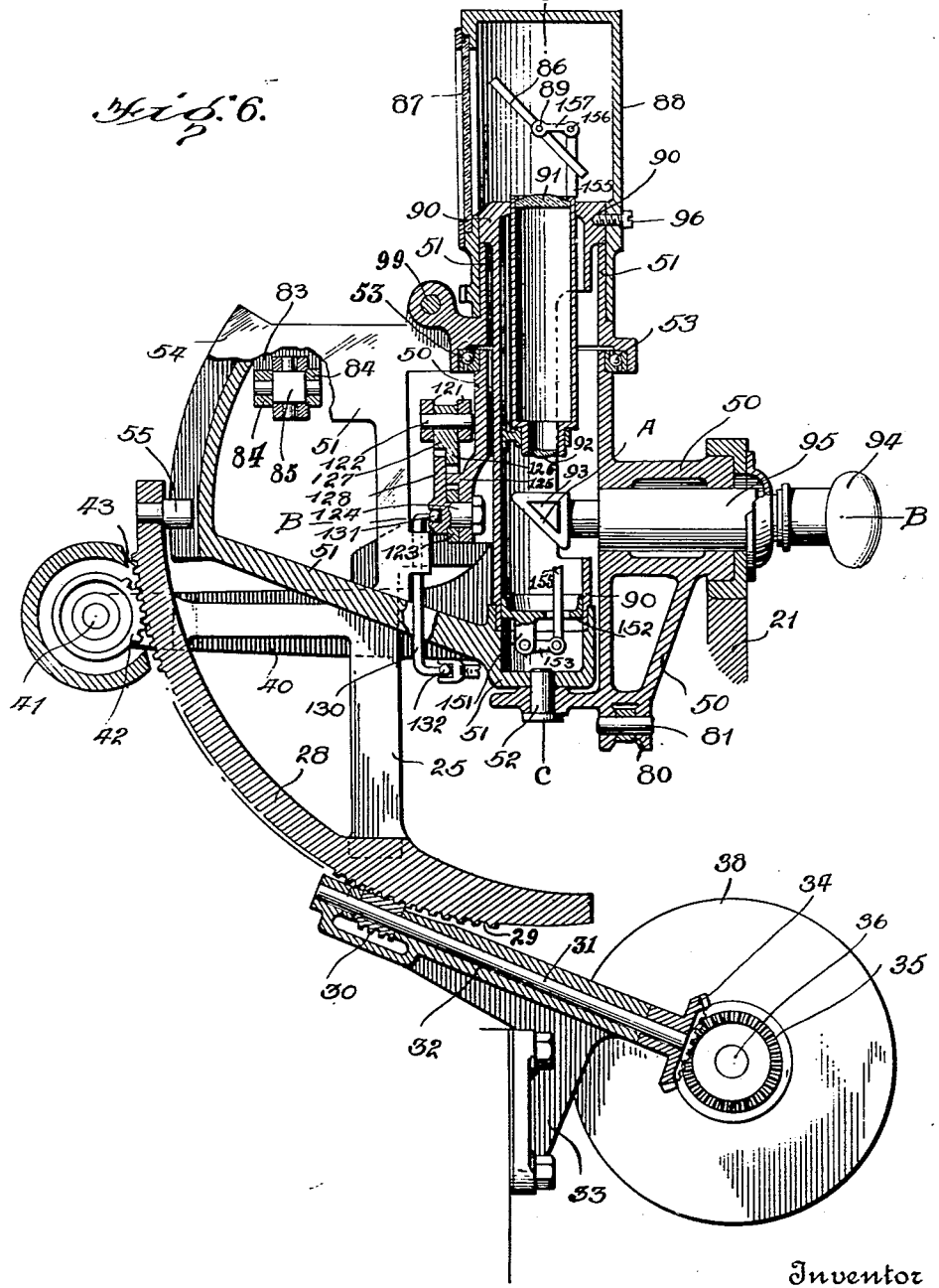

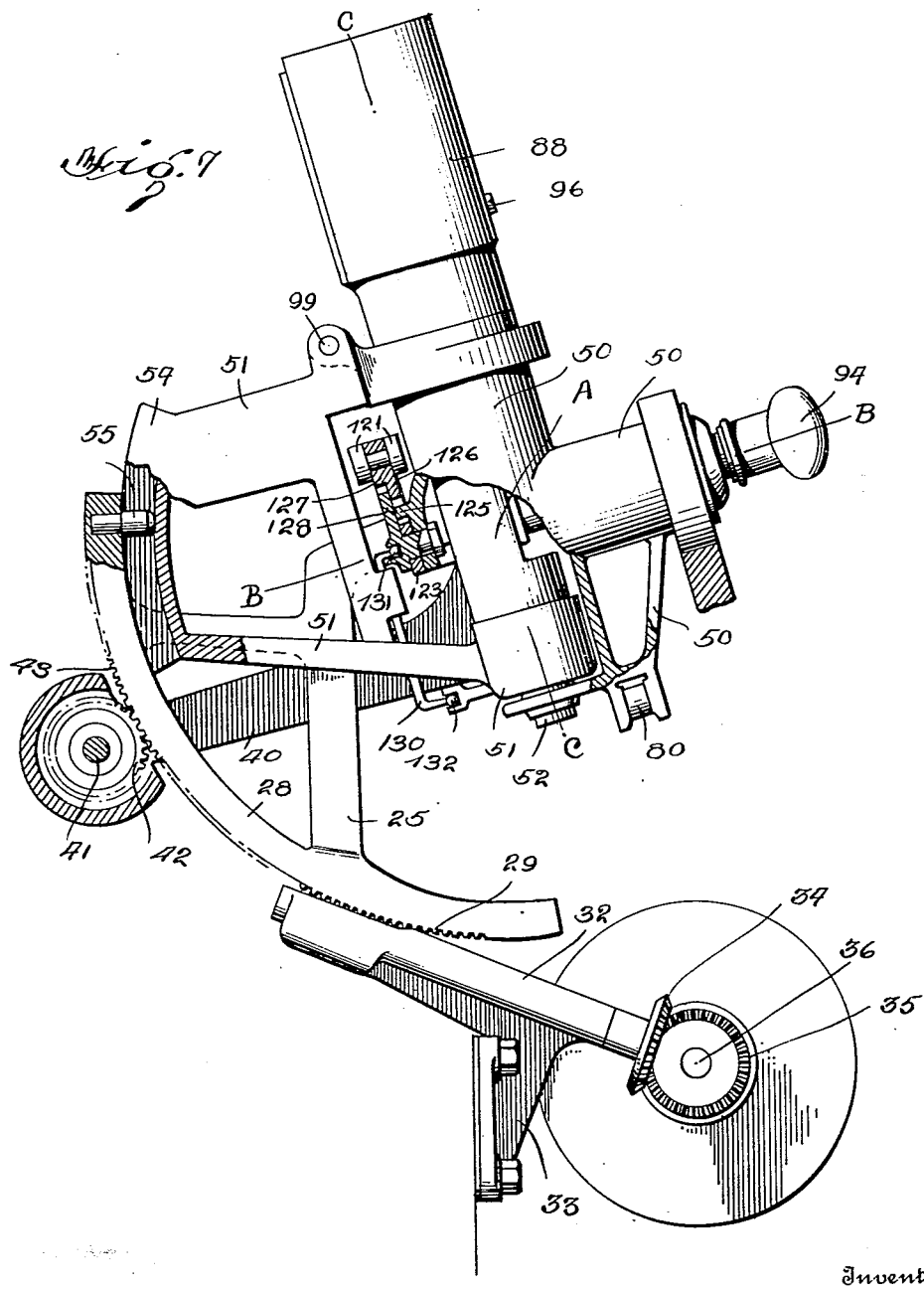

March 24, 1925.

L. RADFORD

FIRE CONTROL

Filed Oct. 21, 1921

1,531,132

10 Sheets-Sheet 7

Inventor
L. Radford

March 24, 1925.
L. RADFORD
FIRE CONTROL
Filed Oct. 21, 1921
1,531,132
10 Sheets-Sheet 8
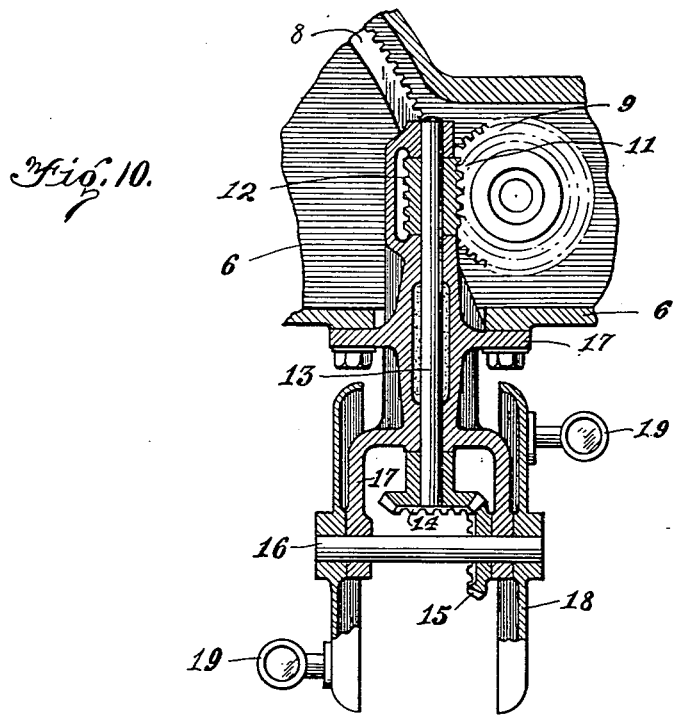
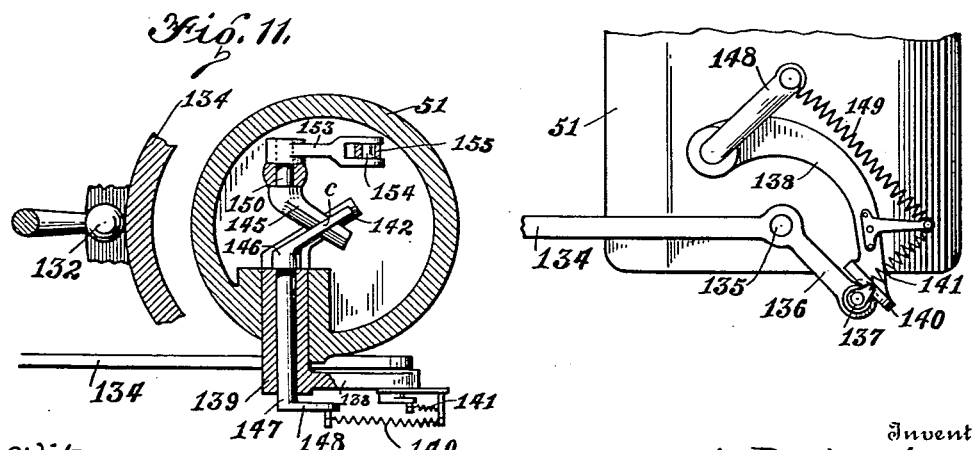
Inventor
L. Radford

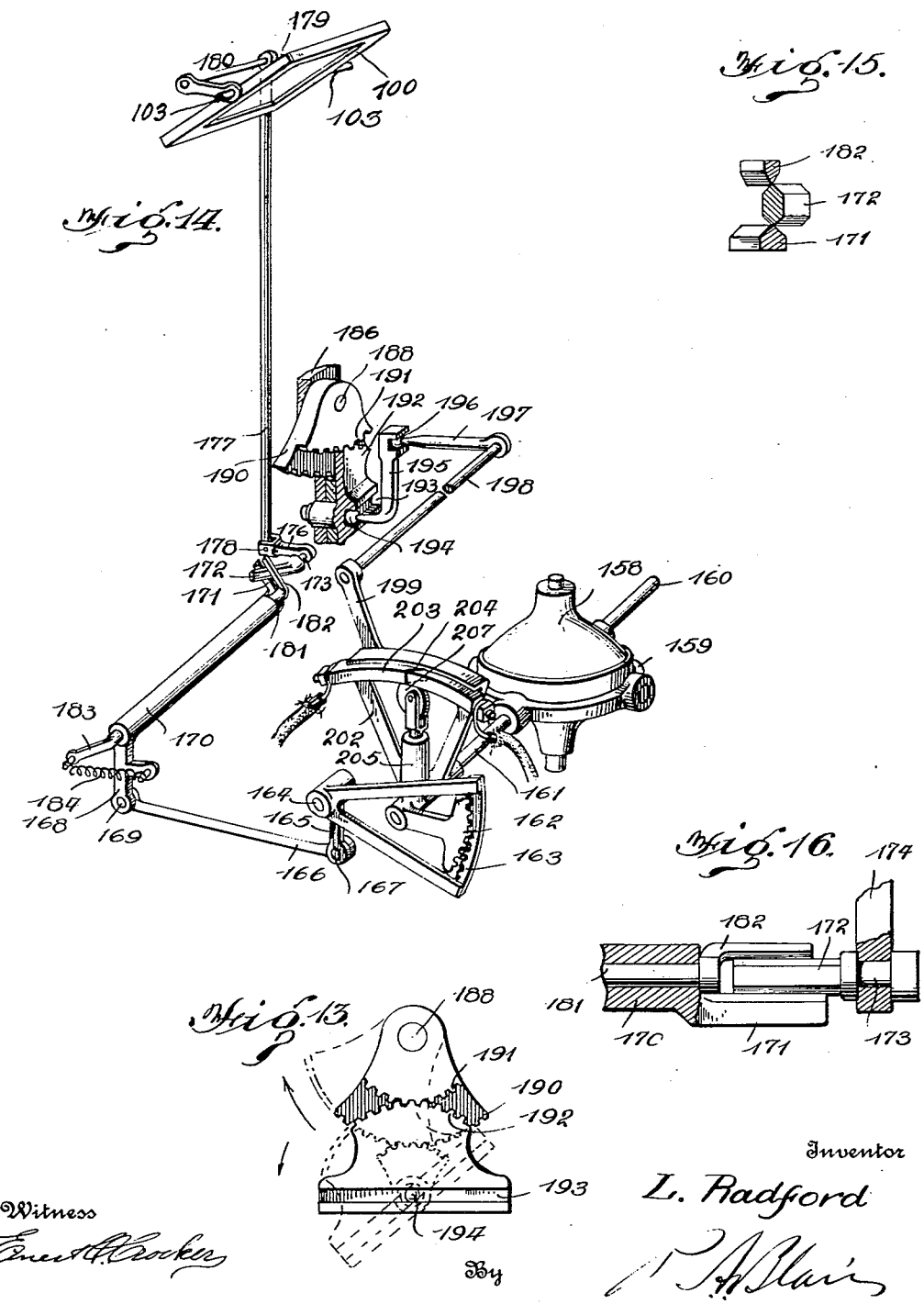

March 24, 1925. 1,531,132
L. RADFORD
FIRE CONTROL
Filed Oct. 21, 1921 10 Sheets-Sheet 10
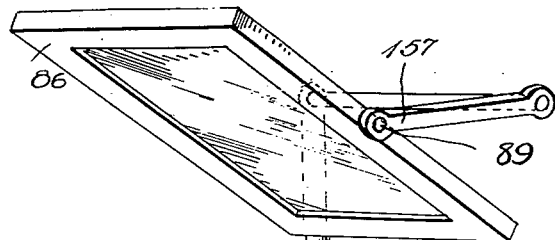
Fig. 17,
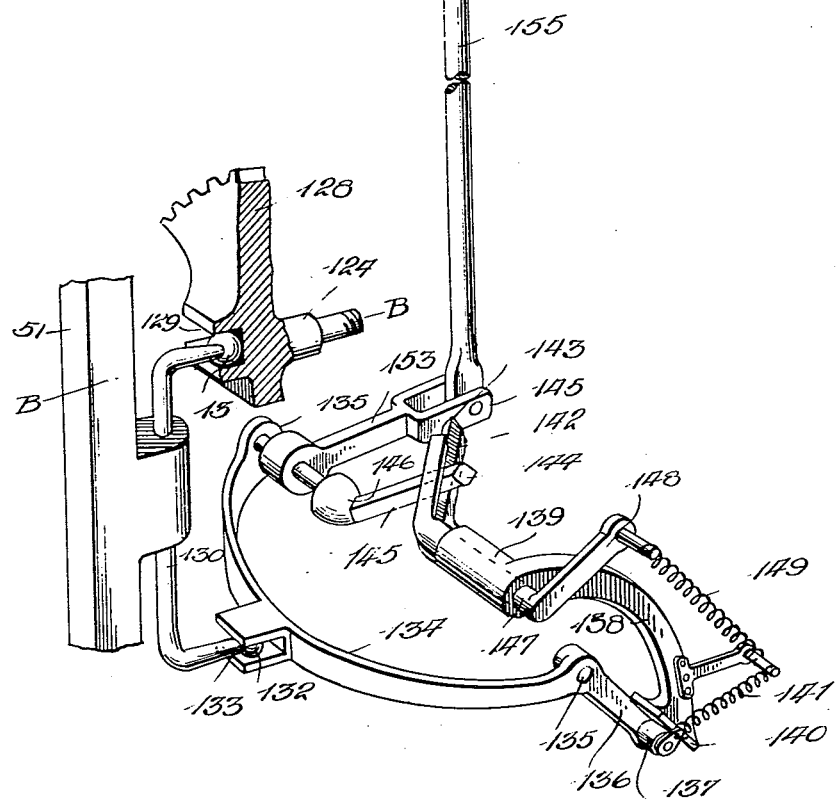
Witness.
Inventor
L. Radford
By
Attorney Patented Mar. 24, 1925.

1,531,132

UNITED STATES PATENT OFFICE.

LAWRENCE RADFORD, OF WASHINGTON, DISTRICT OF COLUMBIA.

FIRE CONTROL.

Application filed October 21, 1921. Serial No. 509,387.

*To all whom it may concern:*

Be it known that I, LAWRENCE RADFORD, a citizen of the United States, residing at Washington, District of Columbia, have invented new and useful Improvements in Fire Controls, of which the following is a specification.

This invention relates to improvements in fire control, and more particularly to a method and improved apparatus for controlling the fire of guns which are mounted on an inclined structure, or on a moving or oscillating structure. In my co-pending application, Serial No. 368,157 is contained a discussion of certain errors which are introduced in the fire of guns mounted on such a structure or a platform, due to the inclination of the trunnions of such guns from the horizontal. One of the objects of the present invention is to provide an improved apparatus and method whereby the errors which would be introduced in the fire of guns mounted on such structures will be reduced to a minimum, and furthermore to provide an improved apparatus and method whereby the fire of guns mounted on a moving or oscillating platform, or of guns so located that the axis of train of the carriages or mounts thereof are not vertical, may be controlled with greater accuracy than has heretofore been attainable.

The nature of the present invention may be readily understood from the description hereinafter contained, wherein reference is made to the accompanying sheets of drawings. This description and these drawings refer to one of various possible embodiments of the invention, which embodiment may be termed a directorscope, that is, an instrument for controlling the fire of one or more guns from a single station, or by means of a single sighting instrument, which instrument or station need not be situated in the immediate vicinity of said gun or guns. In these drawings where similar parts are correspondingly indicated—

Figure I shows an elevation of the left side of the instrument with certain parts shown in section, as will be pointed out in more detail hereinafter; Figure II is a rear elevation of the directorscope, also with certain parts shown in section; Figure III is a plan view, with certain parts shown in section; Figure IV is a vertical section of the right hand periscope and gyroscope case; Figure V is a view of a small portion of the right hand side of the directorscope; Figure VI is a vertical section through lines C C (Fig. II) and B B (Fig. III); Figure VII is a side elevation, partly in section, showing the same parts as shown in Fig. VI, but with certain of these parts in a different operative position; Figure VIII is a vertical section on line VIII—VIII of Fig. III; Figure IX is a side view of the interior of the right hand compartment of the case 62, shown in Figure III, with cover removed; Figure X is a horizontal section on line F, F of Figure II; Figure XI is a horizontal section through the lower end of the left periscope; Figure XII is a view of the left side of the lower part of the left periscope; Figure XIII is a vertical transverse section through line XIII, XIII (Fig. IV); Figure XIV is a perspective view of the mechanism whereby the gyroscope housed in the case 62 is enabled to operate the mirror in the upper portion of the right periscope, as well as of certain other mechanisms for closing an electric circuit, as will be explained; Figures XV and XVI are detailed views of certain parts of the mechanisms shown in Figure XIV; Figure XVII is a perspective view of the mechanism operating the mirror in the upper portion of the left periscope; and Figure XVIII is a horizontal section along line XVIII, XVIII of Figures IV and IX, showing in more detail certain of the parts shown in Figures IV, IX, and XIV.

Referring first to Figures I and II, 1 is the base of the instrument, which may be secured immovably to the structure upon which the directorscope is mounted. To this base is immovably attached a central pedestal 2, and upon the base and pedestal is carried, rotatably, the carriage 3, in the ball-bearings 4 and 5. Frame 6 carrying the uprights 7, 7, is secured to the carriage 3. Referring also to Figure X, the large gear 8, is non-rotatably secured to the fixed pedestal 2, and meshes with the smaller gear 9, which latter is non-rotatably secured to the vertical shaft 10, this shaft being supported rotatably, in bearings in the carriage 3 and frame 6. Also non-rotatably mounted on this shaft 10 is a wormwheel 11, which meshes with the worm 12, this worm being keyed non-rotatably to the horizontal shaft 13. To the other end of this shaft 13 is non-rotatably secured a bevel-gear 14, meshing with another bevel-gear 15, which latter is non-rotatably keyed to the shaft 16. This shaft 16 is carried in bearings in a bracket 17 secured to frame 6, and carries non-rotatably attached at each of its ends, a handwheel 18, each handwheel being provided with a handle or grip 19.

Each of the uprights 7, 7, is provided at its upper end, with a journal 20, 20 in which is supported the frame 21 (see also Figure III), this frame being capable of rotation about the axis AA of the bearings in said journals. Cast in one with frame 21 are two arms 22 and 23, the shaft 24 being secured non-rotatably to arm 22. To arm 23 is secured, non-rotatably, a shaft (not shown) the axis of which coincides with the axis of shaft 24, and also with axis AA. A bracket, 25 carries a journal 26, into which fits the shaft keyed to arm 23, and also carries the sleeve 27, into which fits, rotatably, the shaft 24. This sleeve, in turn, is held rotatably in the journal 20, as shown in Figure II. The bracket 25 carries an arc 28 (see also Figures VI and VII) on one sector of the periphery of which are cut worm-wheel teeth 29, meshing with the worm 30, which worm is keyed non-rotatably to the shaft 31. This shaft, which is supported in a bearing 32 secured to frame 6 by the bracket 33, carries at its other end a bevel-gear 34 which meshes with a bevel-gear 35. This bevel-gear 35 is keyed non-rotatably to a shaft 36 which is supported in bearings 37, 37 in the bracket 33. To each end of shaft 36 is keyed non-rotatably a handwheel 38, 38, each handwheel being provided with a handle 39, 39. The frame 21 also carries a bracket 40, in which is carried, rotatably, shaft 41. To this shaft 41 is keyed non-rotatably, a gear 42 which meshes with the gear teeth 43 cut on the periphery of the arc 28. Also keyed non-rotatably to shaft 41 is a worm-wheel 44 meshing with worm 45, which is keyed non-rotatably to shaft 46, to which shaft is also keyed non-rotatably, the handwheel 47. Also secured, non-rotatably, to shaft 41 is a pointer 48, which indicates the amount of rotation of said shaft by means of a suitable scale engraved on the dial 49 on piece 40.

Supported in frame 21 is a piece 50, rotatable about axis BB in said frame (Figures VI and VII). In this piece 50 is supported, in turn, another piece 51, rotatable about axis CC. At its lower end this piece 51 is held by the pin 52 which is secured to piece 50, and at its upper end said piece 51 rotates in the ball-bearing 53. Cast in one piece with piece 51 is a piece 54, in the form of a sector of a ring, the outer surface of which is spherical, with center at the intersection of axes BB and CC. There is cut in the outer surface of this piece 54 a lengthwise groove, shown in cross-section in Figure III, the plane of the center of this groove passing through axis CC. In this groove fits a pin 55, secured in piece 28, with its axis directed toward the point of intersection of axes BB and CC.

Referring to Figure IV, there is also carried in the frame 21 a piece 56 rotatable about axis DD, and in this piece 56 is carried, in turn, another piece 57 rotatable about axis EE. This piece 57 is held in piece 56 by means of the pin 58, which is secured in piece 56, and also by the ball-bearing 59. Secured to the piece 57 are two arms 60 and 61, to which arms is attached the gyroscope case 62.

An arm 63 (Figures I, II and III) is secured, rotatable about axis FF, in frame 21 by means of the shaft 64 and the ball-bearing 65, axis FF being parallel to, and lying in the same plane as axes BB and DD. To the other end of this arm 63 is secured the periscope 66, with its eye-piece at 67, the axis of said eye-piece coinciding with axis FF. To this arm 63 may also be attached a leveling device, such as a bubble level, which is not shown. The objective window of this periscope 68, looks out in a direction perpendicular to a plane passing through axis FF and the axis of part 66. To the hub 69 of arm 63 is immovably attached a sector of a gear, 70 which meshes with a gear 71 non-rotatably carried on shaft 72. This shaft 72 is carried rotatably in bearings in the arm 73, which arm is cast in one with frame 21. Shaft 72 is parallel to axis FF, and carries at its forward end a bevel gear 74 meshing with a bevel-gear (not shown) which is carried non-rotatably, on the transverse shaft 75. This transverse shaft is supported in bearings 76, 76 in the arm 73, and to it, at each end, is keyed non-rotatably a handwheel 77, 77, each handwheel being provided with a handle or grip 78, 78. The sector of gear 70 carries a pin 79 which is held rotatably in a bearing (not shown) in the rod 80. This rod is provided with an eye at each end, in one of which fits the pin 81 secured in piece 50, and in the other of which fits the pin 82 secured in piece 56. The axes of pieces 81, 79 and 82 lie in the same plane, and are parallel, and the perpendicular distance of the axis of each pin from the corresponding one of the axes BB, FF and DD is the same. Thus the axis of the vertical part of periscope 66, and the axes CC and EE always remain parallel.

Referring now to Figures III and VI, to piece 51 is attached a lug 83 to which is secured one end of the bar 84 by means of a universal joint 85. At the other end of this bar 84 it is attached to a lug on the arm 60 by a similar universal joint (not shown). The construction is such that the distance between the vertical axes of these two universal joints is equal to the distance between axes CC and EE. Also the vertical axes of these universal joints are each parallel to axes CC and EE, and the distance from the vertical axis of the universal joint 85 to axis CC is equal to the distance of the vertical axis of the other universal joint from axis EE. By this construction it is assured that the angle of rotation of piece 57 about axis EE is always equal to the angle of rotation of piece 51 about axis CC.

In Figure VI is shown a detailed view of the periscope, the axis of the vertical portion of which coincides with axis CC. This may conveniently be designated the pointer's periscope. The mirror 86, by which light is received from the target through the glass window 87 in cap 88, is pivoted at 89 so that it is rotatable about an axis perpendicular to axis CC, the pivots 89 being supported by uprights attached to the tube 90 (these supports are not shown). The light from the target falling on mirror 86 is reflected downward into the objective lens 91, which forms an image of the target on the upper face of the lens 92. The upper face of this lens 92 is a plane, and etched thereon are two diametrical lines at right angles in such position that, to an eye placed at 94, one of said lines appears to lie horizontally and the other to stand vertically. 93 is a right angle prism by means of which the image formed on the surface of lens 92 may be viewed by an observer whose eye is located at 94, using an erecting eyepiece located in the tube 95. 94 is simply a soft rubber buffer or guard for the convenience and comfort of the observer. The cap 88, which is non-rotatably secured to the tube 90 by means of the screw 96, is provided on its periphery with worm-wheel teeth 97 which mesh with the worm 98 shown in Figure III. This worm is carried non-rotatably on a shaft 99 which turns in a bearing in piece 51 (see also Figure I).

In Figure IV is shown a detailed view of the periscope the axis of the vertical portion of which coincides with axis EE, and which may conveniently be termed the trainer's periscope. The construction of parts 100, 101, 102, 103, 104, 105, 106, 107, 108, 109, 110 and 111 is exactly the same as of the corresponding parts of the pointer's periscope just described. The worm wheel teeth 111 mesh with a worm 112 (shown in Figure III). This worm is keyed non-rotatably to the shaft 113 which turns in a bearing in the arm 60.

Referring now more particularly to Figure III, each of the worms 98 and 112 contains in its interior a universal joint. The distance between the vertical axes of these universal joints, which axes are both parallel to axes CC and EE, is equal to the distance between axes CC and EE, and furthermore the vertical axes of these two universal joints are equidistant from axes CC and EE respectively. Keyed to shaft 99 is a bevel-gear 114 which meshes with a bevel-gear 115 keyed to shaft 116, which latter shaft turns in a bearing in piece 51 and to which is keyed non-rotatably the handwheel 117 (see also Figure I). The pointer 118ª is secured non-rotatably to shaft 99, and moves around on the dial 118, which dial is secured to piece 51. It is evident that, by means of a suitable scale engraved on said dial, the angle through which the periscope cap 88 is caused to rotate about axis CC may be read.

As will be seen by reference to Figure III, rod 119 is connected at one end to the worm 98 by means of the universal joint contained in said worm, and at its other end to worm 112 by means of the universal joint contained in this latter worm. Therefore it will be understood that when handwheel 117 is rotated, the angle through which the periscope cap 102 is caused to rotate about axis EE is always equal to the angle through which the periscope cap 88 is caused to rotate about axis CC. Also, as will be understood from the construction just described, the same rotation is always applied to the two tubes, 90 and 104, to each about its own axis, and therefore the axes of the pivots upon which the mirrors 86 and 100 are carried, always remain parallel.

As will be seen by reference to Figure II, there is securely attached to the two arms 22 and 23 of frame 21, a bracket 120 (shown also in Fig. I). Referring now to Figure VI, it will be seen that this bracket 120, where it passes in front of the periscope, is divided into an upper and lower branch. The upper branch 121 is again divided and forms a double support for the pin 122. The lower branch 123 is drilled to form a bearing for the shaft 124. Attached non-rotatably to piece 50 is a sector of a gear 125, whose center lies on axis BB, and which meshes with the sector of a gear 126, which latter piece, is carried rotatably on the pin 122. This piece 126 is non-rotatably secured to another gear-sector 127, also rotatably carried on pin 122. This latter gear meshes with a gear-sector 128, to which the shaft 124 is non-rotatably attached, and which rotates about axis BB in the bearing in part 123 of the bracket 120. There is cut on the forward face of piece 128, as will be seen by reference to Figure XVII, a diametrical groove 129. With this arrangement of gears it will readily be seen that the direction of rotation of pieces 50 and 128 about axis BB is always the same. Furthermore the angular spacing of the teeth on each of the gears 125, 126, 127 and 128 is such that part 128 rotates about axis BB through one-half the angle through which part 50 is turned about the same axis.

A rod 130, bent at each end as shown, is held non-rotatably in a bearing in a lug on piece 51, but is capable of longitudinal, i. e., up and down, motion in said bearing. A ball 131 on the upper end of this rod fits slidably in the groove 129. A similar ball 132 on the lower end of rod 130, at the same distance from axis CC as ball 131, fits in a socket 133, which socket is secured to the stirrup 134. This stirrup is rotatably secured by two bearings 135, one on either side of piece 51, the axis of which bearings intersects axis CC. Immovably secured to stirrup 134 is an arm 136 on which is secured a roller 137 rotatable about an axis parallel to the axis of the bearings 135. A lever 138 keyed non-rotatably to shaft 139, which shaft is rotatably held in a bearing in piece 51, carries at its lower end a foot or bearing surface 140, which surface is held in contact with the roller 137 by means of the spring 141. At the other end of shaft 139 is immovably attached an arm 142, the axis of which makes an angle of approximately 135 degrees with the axis of shaft 139. This arm 142 is provided with a knife-edge on its upper surface, which knife-edge is held in contact with a similar knife-edge 144 on the lower surface of the arm 145 by means of lever 146, shaft 147, lever 148 and spring 149. The arm 145 is secured to a shaft 150, which shaft is held rotatably in a bearing in a lug 151 secured to piece 152 (see Fig. VI). This piece 152, in turn, is non-rotatably held in the tube 90. Another lever 153, is secured non-rotatably to the shaft 150. The other end of this latter lever is forked, and carries a pin 154 which fits rotatably in an eye in the lower end of the rod 155. At its upper end this rod 155 is provided with an eye into which fits, rotatably, a pin 156, which pin is carried in a fork in the end of the lever 157. This lever, which is shown in Figure VI, and in Figure XVII, is attached non-rotatably to the mirror 86, and the distance between the axis of the pivots 89 and the axis of pin 156 is exactly equal to the distance between the axis of shaft 150 and the axis of pin 154. Also these four axes are parallel, and a plane determined by the axes of pivots 89 and pin 156 is parallel to a plane determined by the axes of shaft 150 and pin 154. Furthermore, the dimensions and disposition of the parts is such that the axis of bearings 135 is parallel to, and equidistant from, the axes of rotation of roller 137 and shaft 139. As a consequence of this construction, the angle of rotation of arm 142 about the axis of shaft 139 is substantially equal to half the angle of rotation of stirrup 134 about the axis of bearings 135, the difference between half the angle of rotation of 134 and the angle of rotation of 142 being negligible. Furthermore, by reason of the construction as described, the angle of rotation of arm 145 about the axis of shaft 150 is always equal to the angle of rotation of arm 142 about the axis of shaft 139, even though the axes of 150 and 139 are inclined to each other. Also, it will be seen that, by means of lever 153, rod 155, and lever 157, the mirror 86 is caused to rotate about the axis of pivots 89 through the same angle as shaft 150 rotates about its axis.

Referring now more particularly to Figures II, III, IV, VIII, IX and XIV, the case 62 is supported on piece 57 by means of the arms 60 and 61, all of these parts being rotatable about axis EE. In this case 62 is mounted a gyroscope 158, whose outer gimbal ring, 159, is carried on the coaxial shafts 160 and 161, which turn in bearings in the case 62. To shaft 161 is keyed non-rotatably a sector of a gear, 162, which meshes with a sector of an internal gear 163. This gear 163, whose radius is twice that of gear 162, is supported on a shaft 164 secured to the casing 62. Secured non-rotatably to gear 163 is a lever 165, which, in turn, is secured to the rod 166 by means of a pin 167. At its other end rod 166 is secured to the lever 168 by means of pin 169. The lever 168 is secured non-rotatably to the hollow shaft 170, which shaft is held rotatably in bearings in the arm 61 and in piece 57. Secured non-rotatably to the hollow shaft 170 is an arm 171 extending in a direction approximately 135 degrees from the axis of shaft 170, the upper surface of which arm is provided with a knife-edge. Another lever arm 172, the lower surface of which is also provided with a knife edge, is secured non-rotatably to the shaft 173, which shaft is carried in a bearing in the lug 174. This lug is a part of the disc 175, which disc is secured non-rotatably to the tube 104 (see Fig. IV). Secured non-rotatably to shaft 173 is a lever 176, to the end of which is secured the rod 177 by means of the pin 178. The upper end of the rod 177 is secured to the end of lever 179 by means of the pin 180. The knife-edge on the lower surface of the lever 172 is held in contact with the knife-edge on the upper surface of the arm 171 by means of the shaft 181, lever 182, lever 183, and spring 184, the levers 182 and 183 being non-rotatably secured to shaft 181, which is held rotatably in the hollow shaft 170. The construction of levers 171, 172, and 182 may be more clearly understood by reference to the cross-section, Figure XV and to Figure XVI, the latter figure being a longitudinal vertical section along the axis of shaft 170. The axes of bearing 164, 167, 169 and of shaft 170 are all parallel to the axis of rotation of the gimbal ring 159, and furthermore the distance between the axes of 164 and 167 is equal to the distance between the axes of 169 and 170. Also the distance between the axes of 167 and 169 is equal to that between the axes of 164 and 170. Thus it is evident that the angle of rotation of shaft 170 about its axis is equal to the angle of rotation of gear 163 about the axis of its bearing, which angle, in turn, is equal to half the angle of rotation of shaft 161 about its axis. Furthermore the construction of levers 171 and 172, and the shaft to which each is attached, is such that the point of contact of the two knife-edges is equidistant at all times from the axes of shafts 170 and 173. Furthermore the axes of shaft 173, pin 178, pin 180, and the mirror pivots 103 are all parallel, and the distance between the axes of shaft 173, and pin 178 is equal to the distance between the axis of pin 180 and the axis of the mirror pivots 103. Also the distance between the axes of pins 178 and 180 is equal to that between the axes of shaft 173 and pivots 103. Therefore it is evident that the rotation of mirror 100 about the axis of the pivots 103 is always equal to the rotation of gear 163 about the axis of 164, which rotation, as has been explained, is equal to half the rotation of the gimbal ring 159 about the common axis of shafts 160 and 161.

Referring now to Figures II and III, and more particularly to Figures IV, VIII, IX, XIII, and XIV, the frame 21 carries a bracket 185 extending around in front of the periscope shown in Figure IV. Directly in front of the periscope tube this arm is divided into two branches, the upper branch being again divided into two parts 186, 186 forming a double support for pin 188, and the lower branch of the arm 185 being shown as part 187. Non-rotatably secured to piece 56 is a sector of a gear 189, with center on axis DD, which meshes with a sector of a gear 190, rotatably carried on pin 188. This sector of gear 189 is non-rotatably secured to another sector of gear 191, also rotating on pin 188, and this gear 191 in turn meshes with a fourth sector of a gear 192, the shaft of which turns about axis DD in a bearing in the lower branch 187 of the arm 185. On the forward surface of piece 192 is cut a diametrical groove 193 in which the ball 194 fits slidably. The construction of parts 186, 187, 188, 189, 190, 191, 192 and 193 is exactly the same as of parts 121, 122, 123, 124, 125, 126, 127, 128 and 129, shown in Figure VI and described in detail hereinbefore. The ball 194 is secured to the lower end of a pin 195 which is carried slidably, but non-rotatably, in a bearing in a lug on the arm 60. At its upper end the pin 195 is provided with a socket in which fits the ball 196 secured to the end of the lever 197. The construction of these parts is such that the distance from axis EE of the points of contact of the ball 194 with the sides of the groove 193 is equal to the distance from the points of contact of ball 196 with the walls of its socket to the axis of rotation of shaft 198, to which shaft lever 197 is non-rotatably attached. This shaft 198 is carried rotatably in bearings in arm 60 and case 62, the axis of said shaft being parallel to the axis of rotation of the gimbal ring 159, and therefore parallel to the axis of shaft 170. To the other end of shaft 198 is secured non-rotatably a lever 199 carrying a sector of a gear 200. This gear 200 meshes with a sector of a gear 201 which is secured to the bracket 202. This bracket 202 is carried rotatably on shaft 161, and the radius of gear 201 is equal to the radius of gear 200. The bracket 202 carries an arc 203 which is electrically insulated from the bracket 202. This arc 203 is divided transversely into two parts by the thin strip of insulating material 204. To each of the parts of arc 203 is connected one terminal of the electrical circuit by means of which the guns whose fire it is desired to control by the directorscope, may be fired. Secured non-rotatably to shaft 161 is an arm 205 in which a hole is drilled to receive the pin 206. In a fork in the end of pin 206 is carried rotatably a roller 207, which roller is held in contact with one or the other, or both, of the parts of piece 203 by means of the spring 208.

Referring to Figures I and II, 209 is the casing of a transmitter by means of which one or more receivers located on or near each of the guns whose fire it is desired to control by means of the directorscope, may be caused to indicate the direction to which the directorscope is turned or trained about its vertical axis in order that the periscopes of the directorscope may be directed toward the target. In the embodiment of the invention shown in the accompanying drawings, an electrical transmitter is shown. Secured non-rotatably to the fixed pedestal 2 is a flange or ring 210, on the periphery of which are cut gear teeth. These gear teeth mesh with the gear 211 keyed non-rotatably to the shaft 212. This shaft is carried rotatably in bearings in the case 209, which case is secured immovably to the carriage 3. The moving parts of the transmitter housed in the case 209 are operated by means of a gear (not shown) which is keyed non-rotatably to shaft 212. The details of this transmitter, as well as of the two transmitters hereinafter referred to, are not shown in the accompanying drawings, since the present invention is not concerned with any particular design of transmitter, and furthermore since the design and construction of such transmitters are well known to those skilled in the art. The transmitter housed in the case 209 communicates with the receiver or receivers hereinbefore referred to by means of the electric cable 213, which is led upward and then down through the central opening in the pedestal 2.

Referring now to Figures I, II and III, sleeve 27 which, as has already been pointed out, is secured immovably to bracket 25, carries on its outer end a bevel-gear 214. This bevel-gear meshes with a bevel-gear 215 which is keyed non-rotatably to shaft 216. This shaft 216 leads to the interior of a transmitter, the case of which, 217, is secured to the upright 7. This transmitter, the movable parts of which are operated by means of shaft 216, is for the purpose of causing one or more receivers, or indicators, located on or near each of the guns whose fire it is desired to control, to indicate the angle through which arc 28 is elevated or depressed about axis AA. For this purpose the transmitter communicates with said indicator or indicators by means of the electric cable 218, which cable is also led down through the interior of pedestal 2.

Referring now to Figures II and IV, the periscope tube 219, which is held non-rotatably in tube 104, is provided on its periphery with gear-teeth 220, which mesh with gear 221. This gear 221 is keyed non-rotatably to the shaft 222, which shaft is supported in bearings in the case 223, this case, in turn, being secured immovably to piece 56. The shaft 222 is attached non-rotatably to the upper end of the flexible shaft 224. At its lower end this flexible shaft is secured non-rotatably to the shaft 225, which latter shaft is held in bearings in the case 226, this case, in turn, being attached immovably to the carriage 6. Gear 227 is keyed non-rotatably to shaft 225 and meshes with a gear 228, which latter gear is keyed non-rotatably to shaft 229, this shaft being carried rotatably in bearings in case 226. The axis of shaft 229 coincides with the axis of the ball-bearings 4 and 5, and therefore with the axis of rotation of the carriage 3. 230 is the casing of a third transmitter, which casing is secured non-rotatably to the pedestal 2. Shaft 229 is keyed non-rotatably to the movable transmitter parts housed in said casing 230, and it is obvious that, as the carriage 3 is turned about its axis of rotation, the same angle of rotation is imparted to shaft 229 by means of the gears 227 and 228, provided there is no rotation of shaft 225 in its bearings. The gears 220 and 221 would have the same number of teeth if gear 220 were a complete circle, and likewise gears 227 and 228 have the same number of teeth. Therefore it is obvious that, if tube 219 is caused to rotate about axis EE, shaft 229 will be caused to rotate about its own axis through the same angle, and in the same direction, provided there is no rotation of carriage 3 in the bearings 4 and 5. Furthermore it will be seen that the actual rotation of shaft 229 will be either the sum or difference of the separate rotations of carriage 3 and of tube 219, each about its own axis, according as these separate rotations are in the same or opposite directions. An electric cable (not shown) leads from the transmitter housed in the case 230 down through the center of the pedestal and base of the instrument, and serves to establish electrical connection between said transmitter and the indicator or indicators operated thereby.

The method of operation of the embodiment of the invention hereinbefore described may be understood from the following description, wherein it is assumed that the axis of rotation of carriage 3 of the directorscope is maintained parallel at all times to the axis about which the carriage or mount of each of the guns whose fire it is desired to control by means of said directorscope, is turned, or trained in azimuth in order that the plane of fire of each of said guns shall have the proper direction. This said axis of the carriage or mount of each of the said guns may conveniently be termed the axis of train of said gun, and the axis of rotation of the carriage 3 in the bearings 4 and 5 may be termed the axis of train of the directorscope.

First let it be assumed that the structure upon which are mounted the directorscope and the guns whose fire it is desired to control thereby, is in such position that the axes of train of the directorscope and of each of the said guns, are vertical. Now let it be assumed that the range, or distance, and the direction of the target are known. The range being known, it is first necessary to adjust the directorscope for this range, in order that each of the said guns may be elevated to the angle to cause the projectile fired from each of said guns to travel the desired distance. This adjustment for range is made by turning the hand-wheel 47 until the pointer 48 indicates the desired range on dial 49 which may conveniently be graduated in units of distance, if so desired. This turning of the handwheel 47 in the proper direction causes rotation of frame 21 about axis AA in such manner that the line of sight of the pointer's periscope is depressed below a line drawn to the target through an angle equal to the angle through which it is necessary to elevate each of said guns above said line to the target. This relative position of parts 21 and 25 is shown in Figure VII. One of the directorscope operators, viz, the one who uses the pointer's periscope, and who may be termed the pointer, now elevates piece 28, frame 21, and therefore all the parts supported on said frame, until the image of the target falls on the horizontal wire of his periscope, assuming, for the moment, that the directorscope has been trained in the proper direction. The means and method whereby the directorscope may be trained in the proper direction will be described hereinafter. The pointer accomplishes said rotation of piece 28 and frame 21 about axis AA by turning the handwheels 38 while looking into the eyepiece of his periscope. It will be understood, from the description hereinbefore contained and from Figure VI, that turning the handwheels 38 causes rotation of piece 25 about axis AA, and therefore causes an equal rotation of the frame 21 and the parts carried thereby, about the same axis, since parts 25 and 21 are locked together by means of the gears 42 and 43 provided no change is being made in the range adjustment during said turning of handwheels 38. As has already been pointed out, piece 25 is secured non-rotatably to the bevel-gear 214, and therefore, when piece 25 is caused to rotate about axis AA, a corresponding rotation of the movable parts of the transmitter housed in the case 217 is produced, and by means of this transmitter suitable indicators located on or near each of the guns whose fire it is desired to control, may be caused to indicate the exact angle through which part 25 and frame 21 have been rotated about axis AA. Therefore each of the said guns may readily be elevated to the desired angle, which, as has already been pointed out, is the angle of rotation of frame 21 about axis AA, and is likewise the angle through which it is necessary to elevate each of said guns in order that the projectile fired therefrom may travel the desired distance. It should also be noted that, when each gun has been so elevated, the elevation thereof above the horizontal is equal to the elevation above the horizontal of the axis of pin 55, which axis, if continued, would under all conditions pass through the point of intersection of axes AA, BB, and CC.

In the foregoing paragraph it has been assumed that the position of the structure upon which the directorscope and guns, are mounted is such that the axis of train of the directorscope is vertical. Now let it be assumed that the position of said structure is such that the axis of train of the directorscope is inclined either toward or away from the target, but lies in a vertical plane passing through said target. Under these conditions it will be understood that it would be necessary to elevate the aforesaid guns through either a greater or smaller angle than would be necessary were the said axis of train vertical, depending on whether said axis is inclined toward or away from the target. When the said structure is so inclined, it is obvious that the angle through which piece 25 is rotated about axis AA with respect to frame 21 remains unchanged, but that it will be necessary for the pointer to elevate frame 21 through either a greater or smaller angle, in order to cause the image of the target to fall on the horizontal cross-line of his periscope, and that, in either case, the angle through which said pointer must elevate frame 21 about axis AA is equal to the angle through which each of the aforesaid guns must be elevated.

In the foregoing description of the method of operation of one embodiment of the invention, it has been assumed that the directorscope is trained on the target, i. e., that the vertical planes containing the lines of sight of the two periscopes are directed toward the target. In order to accomplish this one of the directorscope operators, the one who uses the trainer's periscope, and who may be designated the trainer, turns or trains the carriage 3 about the axis of train until the image of the target falls on the vertical cross-line of the trainer's periscope. Said trainer accomplishes this rotation of carriage 3 by means of the handwheels 18, the rotation of which, as will be understood from the description hereinbefore contained, causes rotation of said carriage 3 and frame 6 in the ball-bearings 4 and 5 about the fixed pedestal 2. Moreover, as will be understood from Figure I and the description hereinbefore contained, rotation of carriage 3 about the axis of train causes a corresponding rotation of the movable parts of the transmitter housed in the case 209. By means of this transmitter suitable indicators, one of which may conveniently be located on or near each of the guns whose fire it is desired to control, may be caused to indicate the angle through which the directorscope carriage has been trained, and therefore each of the said guns may be trained in the proper direction, thus providing means whereby the axis of the trunnions of each of said guns may be maintained at all times parallel to axis AA of the directorscope.

Thus, since, as already pointed out, there is located on or near each of the guns whose fire it is desired to control by means of the directorscope, an indicator which will automatically indicate the angle through which piece 25 is elevated about axis AA, and also an indicator showing the angle through which the carriage 3 is trained about its axis of rotation, it is obvious that the personnel operating each of said guns is enabled, by proper manipulation of the same, to cause the axis of the bore of each of said guns to remain parallel at all times to the axis of the pin 55 of the directorscope.

Now let it be assumed that the position of the structure upon which are mounted the directorscope and the aforesaid guns is such that the axis of train of the directorscope is inclined in a plane perpendicular to the line of sight to the target. If this condition obtains, it is obvious that axis AA of the directorscope will be inclined from the horizontal, and also that the axis of the trunnions of each of the aforesaid guns will be inclined from the horizontal through the same angle as axis AA, and in the same direction. As pointed out in my co-pending application, Serial Number 368,157, such inclination of the trunnions of a gun introduces an error in the elevation of said gun, and also an error in the train or direction thereof, formulæ for which errors are contained in said application. As already stated, one of the purposes of the present invention is to provide a means, as well as a method, for the elimination of these errors, which purpose may be accomplished in the following manner:

A third directorscope operator, who may be termed the cross-leveler, observes the horizon in a direction at right angles to the direction of the target, it being assumed for the present that the directorscope is installed on a ship and that a line from the directorscope to the apparent horizon is approximately a horizontal line. The cross-leveler is enabled to view the horizon in this direction at right angles to the direction of the target by means of the periscope 66, 67, 68, and, by means of the handwheels 77, 77, is enabled to rotate said periscope about axis FF, in either direction, in such manner that the image of the apparent horizon falls on the horizontal cross-line of said periscope, or substantially so, at all times. This means that the cross-leveler is enabled to maintain the axis of part 66 in a vertical plane passing through the target, or very nearly in such plane, at all times. Also, by means of the mechanisms shown in Figures II and III, and hereinbefore described, the axis CC of the pointer's periscope, and axis EE of the trainer's periscope, are maintained at all times parallel to the axis of the said part 66, the pointer's periscope being rotated about axis BB and the trainer's periscope about axis DD, each through the same angle, and in the same direction, as the cross-leveler's periscope is rotated about axis FF.

In the preceding paragraph it has been assumed that the directorscope is installed on a ship, and that the horizon is visible. It should be noted, however, that in case the horizon is invisible, or if for any reason observation of the horizon is not desirable as a means for maintaining the cross-leveler's periscope in the desired position with respect to axis FF, the cross-leveler might readily be provided with a spirit level or other leveling device, secured, for instance, to the arm 63, thus providing means whereby the axis of part 66 may be maintained in a vertical plane passing through the target, even under conditions when the use of the cross-leveler's periscope is impracticable or undesirable.

One method of eliminating the aforesaid errors in elevation and direction, or train, introduced in the fire of a gun by reason of the inclination of the trunnions thereof, is to cause the lines of sight of the sighting instruments of the directorscope by means of which said gun is controlled, both in elevation and train, to be deviated, both in vertical and horizontal planes, by angles equal, respectively, to the vertical and horizontal errors introduced by such inclination of the trunnions of said gun, and in the same direction as the corresponding error. These said deviations of the lines of sight of the sighting instruments, and the means and method of accomplishing the same, are more fully explained in the following paragraphs, as well as a means and method whereby the necessary corrections may be applied to the elevation and train of each of the aforesaid guns.

As will be noted from the aforesaid application, No. 368,157, and Figure III accompanying the same, if the inclination from the horizontal of the axis of the trunnions of a gun, which in the present case is equal at all times to the inclination of axis AA from the horizontal, is such that the right end of said axis, as seen by one facing toward the target, is lower than the left end, the projectile fired from said gun will fall to the right of a line drawn from said gun to said target. It is obvious that this error may be eliminated by causing the axis of pin 55 and the line of sight of the pointer's periscope to lie in the same vertical plane at all times. It has already been pointed out that the cross-leveler is enabled to maintain the axis of part 66 in a vertical plane passing through the target, and that axes CC and EE are always parallel to the axis of 66. As part 50 is caused to rotate about axis BB the axis of pin 55 is caused to describe a sector of a conical surface whose axis is BB and the apex of which is the intersection of axes BB and CC. This motion of pin 55 obviously causes a rotation of part 51, and therefore of the parts secured thereto, including the mirror 86, about axis CC, as will be understood by reference to Figure VI. Moreover, by means of the bar 84 and its connection to piece 51 at one end and to piece 60 at its other end, by means of a universal joint in each case, piece 60, and therefore mirror 100, are caused to rotate about axis EE through the same angle and in the same direction, as piece 51 rotates about axis CC. Thus the lines of sight of the pointer's and trainer's periscopes are rotated about axes CC and EE, respectively in such direction and through such angles that each of said lines of sight lies in a vertical plane parallel to the vertical plane passing through the axis of pin 55, and therefore the trainer is enabled to keep the director-scope trained in the proper direction by such operation of the handwheels 18 as is necessary to insure that the image of the target always falls on the vertical cross-line of his periscope. Furthermore, by reason of the transmitter and indicators already described, the personnel operating each of the aforesaid guns are enabled to train the same in the proper direction at all times, since, as has been already pointed out, the axis of bore of each of said guns may be maintained parallel to the axis of pin 55 at all times.

It is likewise shown in application No. 368,157 that, when the trunnions of a gun are inclined from the horizontal in a plane perpendicular to the line of sight to the target, the elevation of said gun is less than when the trunnions thereof are horizontal, provided the axis of bore of said gun is elevated above said line of sight. A method whereby correction for this error in elevation may be made will be understood by reference to Figures VI and XVII, and the following explanation.

Assuming that axis AA and the axis of the trunnions of each of the aforesaid guns are inclined as assumed hereinbefore, let it also be assumed, momentarily, that axis CC is perpendicular to axis AA, i. e., that the cross-leveler has not caused piece 50 to rotate about axis BB. Under these conditions it is obvious that the plane of the groove 129 is parallel to axis AA since, under the conditions assumed, there would be no relative motion of the gears 125, 126, 127 and 128, and all of these said gears would rotate as a unit with piece 50 and frame 21 when the axis AA is inclined from the horizontal. Now let it be assumed that the cross-leveler, by operating the handwheels 77, causes piece 50 to rotate about axis BB until axis CC lies in a vertical plane passing through axis BB. If the angle of inclination of axis AA from the horizontal be denoted by $r$, it is obvious that the cross-leveler, in order to cause axis CC to lie in said vertical plane passing through axis BB, must rotate piece 50 about axis BB through an angle equal to the angle $r$. But in so doing said cross-leveler causes rotation of gear 128, and therefore of the groove 129 about axis BB through an angle equal to one-half of angle $r$, said rotation of gear 128 being in the same direction as the rotation of piece 50. Also, as has been pointed out hereinbefore, rotation of piece 50 about axis BB causes rotation of piece 51 about axis CC, provided the axis of pin 55 is elevated above axis BB. Therefore, since rod 130 is held non-rotatably in piece 51, said rotation of piece 51 about axis CC causes the balls 131 and 132 to revolve about axis CC in such manner that the centers of both balls always move in a cylindrical surface whose axis coincide with axis CC. But since the plane of groove 129 is no longer perpendicular to axis CC, it is obvious that the aforesaid revolution of ball 131 about axis CC will cause rod 130 to move downward in its bearing in piece 51 during the time that the inclination of axis AA from the horizontal is increasing, and likewise stirrup 134 will be caused to rotate downward about the axis of bearings 135, which bearings, as already stated, are carried on piece 51. Therefore, by means of the mechanisms shown in Figure XVII, and hereinbefore described, mirror 86 is caused to rotate about the axis of the pivots 89 in the same direction and through half the angle, that stirrup 134 is caused to rotate about the axis of bearings 135. But, as is well known in the science of optics, if a ray of light is reflected by a plane mirror, rotation of said mirror through a given angle will cause deviation of the reflected ray of light in the same direction, but through an angle twice as great, as said rotation of the mirror. For this reason, the downward rotation of stirrup 134 causes an equal downward deviation of the line of sight of the pointer's periscope.

In application No. 368,157 it is pointed out that, if the elevation of the axis of the bore of a gun above the line of sight to the target be denoted by $e$, the error in direction or train, said error being denoted by M, introduced by inclination of the axis of the trunnions of said gun from the horizontal through angle $r$ is such that $$\tan M = \tan e \sin r$$

It is also pointed out in said application that the error in elevation, said error being denoted by P, introduced by said inclination of the trunnions is such that $$P = e - \sin^{-1}(\sin e \cos r)$$

The angle $e$ in this equation, as will readily be understood is equal to the angle through which frame 21 is rotated about axis AA by means of the handwheel 47 in adjusting the directorscope for range, i. e., is equal to the angle subtended between axis BB and the extended axis of pin 55. Also, as has been pointed out hereinbefore, the axis of the trunnions of each of the guns whose fire it is desired to control by means of the directorscope may be maintained parallel at all times to axis AA. Therefore, the inclination of axis AA from the horizontal is equal to the inclination of the axis of the trunnions of each of the said guns from the horizontal. Under such conditions, rotation of piece 50 about axis BB through angle $r$ causes rotation of piece 51 about axis CC through an angle whose tangent is equal to the product tan $e$ sin $r$, which angle, therefore, is equal to the angle M referred to above.

If the angle through which the stirrup 134 is rotated about the axis of bearings 135, as described hereinbefore, be denoted by Q, the value of this angle is such that:

$$\tan Q = \sin M \tan r/2$$

wherein the angle M has the value found by means of the equation therefor given above. If the values of angles P and Q for given values of $e$ and $r$, be calculated from the equations given above, they will be found to be very nearly equal, even though the values of $e$ and $r$ be considerable.

Therefore, as will be understood from the preceding discussion, when the axes of the trunnions of the aforesaid guns are inclined from the horizontal through any angle $r$ in a plane perpendicular to the line of sight to the target, a lateral deviation of the lines of sight of both the pointer's and trainer's periscopes is introduced, said deviation being equal to, and in the same direction as, the angular error in train introduced in the aim of each of said guns by said inclination of the trunnions thereof. More specifically, if it be assumed as before that said inclination of axis AA and also of the axis of the trunnions of each of the said guns, from the horizontal through said angle $r$ is in such direction that the projectile fired from each of the said guns would fall to the right of a line to the target, the angular value of such error in train would be equal to the angle M, as hereinbefore pointed out. Under such conditions, by means of the mechanisms and operations hereinbefore described, the lines of sight of both the pointer's and trainer's periscopes would be deviated, also to the right, through the same angle M. Therefore it would be necessary for the directorscope trainer to train the carriage 3 to the left, or counterclockwise, in order to cause the image of the target to fall on the vertical cross-line of his periscope. Also, by means of the transmitter contained in the case 209, the amount and direction of said rotation of carriage 3 about its axis of train, and consequently of pin 55 about the same axis, would be transmitted to, and shown by, each of the indicators operated by said transmitter, and the personnel operating or aiming each of the said guns, by observing the indication of said indicator, would be enabled to train said gun to the left, or counterclockwise through such angle as is necessary to cause the projectile fired therefrom to fall on a line to the target.

Likewise it will readily be understood that, when the angle of elevation of each of the aforesaid guns is decreased by reason of the said inclination of the trunnions thereof, the line of sight of the pointer's periscope is deviated downward by means of the mechanisms and operations already described, through an angle very nearly equal to said decrease in elevation of said gun. Therefore, it will be seen that it would be necessary for the directorscope pointer to elevate piece 25, and therefore frame 21, around axis AA, by means of the handwheels 38 through an angle equal to said angle of downward deviation of the line of sight in order to cause the image of the target to fall on the horizontal cross-line of his periscope. Moreover, as has already been pointed out hereinbefore, the amount and direction of such rotation of piece 25 will, by means of the transmitter contained in the case 217, be transmitted to, and shown by, each of the indicators operated by said transmitter, the location of which indicators has already been described hereinbefore, and therefore the personnel operating each of the said guns will be enabled to elevate the same through such angle as is necessary to correct for the error in elevation in said gun introduced by the aforesaid inclination of the trunnions thereof.

In the foregoing description of the method of operation of the directorscope it has been assumed that the structure upon which the said directorscope and the guns whose fire it is desired to control thereby, is stationary during the period required for the various operations. It is obvious however, that in case said structure were a ship, it is almost certain that the same would be in more or less continuous motion. Let it be assumed, as is almost certain to be the case, if the structure in question is a ship, the motion thereof, or one component of said motion, is a more or less continuous rotation or oscillation about a horizontal axis at right angles to the line of sight to the target. Under these conditions it would be possible to operate the system hereinbefore described by any one of three methods. First the directorscope pointer might elevate or depress torscope pointer might elevate or depress part 25, and therefore frame 21 and both periscopes continuously in such manner that the image of the target constantly falls on the horizontal cross-line of his periscope. If this be done, it is obvious that the reading or indication of each of the indicators operated by the transmitter housed in case 217 would change continuously, and therefore that the personnel operating each of the aforesaid guns would constantly increase or decrease the elevation thereof with respect to the axis of train thereof in such fashion that at any instant the elevation of said gun above a line to the target would have the proper value to cause the projectile fired therefrom to travel the desired distance. According to a second method of operation the position of piece 28, and therefore the elevation of each of the said guns with respect to the axis of train thereof, is left unchanged after having been adjusted to the desired elevation, except as readjustment may be desired. In using this method of operation, it is most convenient to provide the directorscope pointer with a suitable electric switch or key connected in the electrical circuit by means of which the said guns are fired, or in a branch thereof, and for the said pointer to fire the said guns by closing the said circuit at the instant the image of the target crosses the horizontal cross-line of his periscope. It should be noted that, when using either of the aforesaid methods of operation, the correction necessary for the elimination of the error in elevation introduced in the aiming of each of the said guns, due to the inclination of the trunnions thereof, may be made continuously by means of the mechanisms and operations already described. According to a third method of operation of the system, the terminals of the electrical circuit whereby the aforesaid guns are fired, or the terminals of one branch thereof, which branch might conveniently be arranged in parallel with the branch leading to the pointer's firing key referred to above, are connected, respectively, to the two parts of the contact piece 203. In the embodiment of the invention shown in the accompanying figures, particularly Fig. XIV, arm 205 may conveniently be adjusted in such manner that its axis is parallel to the axis of rotation of the rotor of the gyroscope 158, and the construction may conveniently be such that roller 207 is in contact with both parts of piece 203 when the axis of train is vertical, provided that axes CC and EE are also vertical. However, as will readily be understood, when the axis of train is inclined in a plane perpendicular to the line of sight to the target, i. e., when axis AA is inclined from the horizontal in said plane, a corresponding adjustment of the relative position of parts 203 and 207 should be made in order that the elevation of each of the aforesaid guns, and therefore of pin 55, above the line of sight to the target, may be of the proper magnitude in order that the projectile fired from said gun will travel the desired distance in spite of the loss in elevation which is ordinarily introduced in the aiming of a gun by said inclination of the trunnions thereof. Let it be assumed, as before, that the inclination of the trunnions of said gun, and therefore of axis AA, is equal to the angle r. As explained before, when this condition obtains, the cross-leveler, by operation of the handwheels 77, causes the line of sight of the pointer's periscope to be depressed through the angle Q. But, in so doing, said crossleveler also causes rotation of parts 202 and 203 about the axis of shaft 161, through the same angle Q, and in the same direction, the result being that roller 207 makes contact with both parts of piece 203 at the instant that the structure upon which the directorscope and the aforesaid guns are mounted assumes such a position that the image of the target falls on the horizontal cross-line of the pointer's periscope, and which, as will readily be seen, is the instant at which the elevation of each of the aforesaid guns is of the proper magnitude to cause the projectile fired therefrom to travel the desired distance. This rotation of part 203 about the axis of shaft 161 with respect to part 207, is produced by the motions imparted to parts 189, 190, 191, 192, 193, 194, 195, 196, 197, 198, 199, 200, 201 and 202, the construction of which has already been explained, by the rotation of the handwheels 77. The construction and operation of parts 198, 190, 191, 192, 193 and 194 is exactly the same as of parts 125, 126, 127, 128, 129 and 131, (see Figures VI and XVII), and therefore, as will be understood, the angular rotation of the shaft 198 about its axis is always equal to the rotation of stirrup 134 about the axis of the bearings 135.

By reference to Figure XIV, it will be seen that the mirror 100 is controlled by the gyroscope 158 by means of parts 161, 162, 163, 165, 166, 168, 170, 171, 172, 176, 177, and 179, the construction and mutual geometrical relations of which have already been described. Since the radius of gear 162 is equal to one-half the radius of the internal gear 163, it will be seen that any rotation of shaft 161 will cause a rotation of mirror 100 about the axis of the pivots 103 in the same direction as, and through onehalf the angle of, said rotation of shaft 161. Therefore rotation of shaft 161 about its axis through a given angle will cause deviation of the line of sight of the trainer's periscope through the same angle and in the same direction. Therefore, if the structure upon which the directorscope is mounted is oscillating about an axis approximately horizontal and at right angles to the line to the target, it is obvious that the image of the target will not move up and down in the field of view of the trainer's periscope, since the gyroscope maintains the axis of rotation of its rotor in a given direction at all times, and will therefore cause the line of sight of the trainer's periscope to maintain a fixed relation to the horizontal plane. Thus, if the trainer keeps the directorscope trained in the proper direction, the image of the target will remain in the center of the field of view of the trainer's periscope at all times.

In the foregoing description of the method of operation of the directorscope it has been assumed for the sake of simplicity, that a gun should be so trained that the axis of the bore thereof lies in a vertical plane passing through the target. But, as is well known in the science of gunnery, it is necessary to train a gun in such manner that the vertical plane through the axis of the bore thereof shall pass either to the right or left of the target. Particularly is this true if the gun be mounted on a moving platform, such as a ship, or if the target be a moving object. The value of the angle between the said vertical plane passing through the axis of the bore of the gun, and the line of sight to the target, which angle is commonly termed the deflection, is dependent upon a number of factors, of which the most important are the drift of the projectile, the speed and direction of motion of both the target and the structure upon which said gun is mounted with respect to a line connecting the two, and the velocity and direction of the wind. It is evident that, in order that said gun may be aimed and fired, with accuracy, the amount and direction of the deflection necessary to allow for the given combination of the above factors must be known or estimated, and it is furthermore evident that said deflection angle should always be measured in a horizontal plane. In the case of the directorscope herein described, adjustment for said deflection is made by rotation of handwheel 117 until pointer 118ª indicates the proper deflection on a scale on dial 118, which scale may be graduated in any convenient units. By means of parts 116, 115, 114, 99, 98, 97, 119, 112 and 111, the construction of which has already been explained, rotation of the handwheel causes rotation of mirror 86 about axis CC and also of mirror 100 about axis EE, these two rotations, each about the axis mentioned, being equal and in the same direction. Furthermore, as will be understood from the description hereinbefore contained, axes CC and EE are maintained very nearly vertical at all times, the rsult being that the angle of deflection, which is the angle through which each of the mirrors 86 and 100 is rotated about its substantially vertical axis, is always measured in a horizontal plane. For example, let it be assumed that it is desired that the vertical plane passing through the axis of the bore of each of the guns whose fire it is desired to control by means of the directorscope, shall lie to the left of a line to the target, and that the angle between said line and said plane shall be equal to an angle $d$. Handwheel 117 is then rotated in such direction, and by such amount, that each of the mirrors 86 and 100 shall be rotated clockwise, or to the right, about axes CC and EE respectively, through said angle $d$. When this adjustment has been made it is obvious that the directorscope trainer will train the carriage 3 to the left or counter clockwise until the image of the target again falls on the vertical cross-line of his periscope. But both the amount and direction of such rotation of carirage 3 is automatically indicated to the personnel operating each of the aforesaid guns by means of the transmitter contained in case 209 and the indicators operated thereby. Therefore, since it is possible to maintain the axis of bore of said gun parallel at all times to the axis of pin 55, as has already been pointed out, the personnel operating said gun are enabled to train the same to the left until the angle between the vertical plane passing through the axis of the bore thereof and a line to the target, is equal to the aforesaid angle $d$.

As already pointed out, the directorscope is provided with a third transmitter, the case of which, 230, is shown in Figure II. It will be understood from the construction hereinbefore described that gear 228 rotates about the axis of shaft 229 through the same angle, and in the same direction, at all times, as mirror 100 rotates about axis EE. Also it is obvious that, as the carriage 3 is rotated about the axis of train, gear 228 is caused to rotate about the axis of shaft 229 through the same angle and in the same direction. Therefore it will be seen that gear 228 is caused to rotate about the axis of shaft 229 through the same angle and in the same direction as the lines of sight of the pointer's and trainer's periscopes are caused to rotate, either about their respective axes CC and EE, or about the axis of train of the directorscope, the result being that suitable indicators, which may be located as desired, and which are operated by said transmitter contained in the case 230, may be caused to indicate at all times the true direction of the lines of sight of the said periscopes. Such indicators might be useful for the purpose of permitting other instruments or devices, for instance a searchlight or telescope which might be located at some distance from the directorscope, to be trained in the same direction, i. e. directed toward the same object or target as the directorscope.

In the foregoing description, for the sake of simplicity and clearness, it has been assumed that the transmitters contained in cases 209, 217 and 230, respectively, are connected to the several indicators mentioned hereinbefore, electrically, and that said indicators are operated by said transmitters by electrical means. It should be noted, however, that the design of said transmitters and indicators might also be such that each of the latter is operated by one of the former mechanically, or by other suitable means, instead of electrically. Furthermore it should be noted that the said transmitters might be of such design and so constructed that the guns, searchlights, or other apparatus which it may be desired to control and direct by means of the directorscope, would be controlled automatically by means of said transmitters, both in elevation and in direction in the case of a gun or guns; for instance, each transmitter might well be of such design and construction that it would govern or control automatically the operation of a motor or other device for effecting the desired movement of said gun, searchlight, or other apparatus.

Also for the sake of simplicity and clearness it has been assumed in the foregoing that, at any given instant, the structure upon which the directorscope is mounted, is either stationary or is moving in such manner that it oscillates about a horizontal line to the target, or about a horizontal line perpendicular to said line to the target, as an axis. It is apparent, however, that the motion of said structure, particularly if it be a ship, might be such as to produce an oscillation about an axis having any direction, or that such motion or oscillation might be the resultant of two or more oscillations, each about an axis which might have any direction. It will be understood, however, that any such motion or oscillation of said structure may be resolved into three component rotations or oscillations, each about one of three mutually perpendicular axes, each of which axes would pass through or near the directorscope, or through or near the guns, searchlights, or other apparatus whose motions it is desired to control. Obviously any set of three mutually perpendicular axes passing through or near the directorscope may be chosen as the axes of reference but it is most convenient to consider the motion of said structure to be the resultant of oscillations about the following three axes; one vertical, the second horizontal and pointing in the direction of the target, and the third a horizontal axis perpendicular to the second named axis. It has been pointed out hereinbefore how the directorscope described makes corrections for the errors introduced by the motions of said structure about the last two of the three axes just referred to. It is obvious that the only error introduced in the aiming of a gun, searchlight, or other apparatus situated on said structure by motion thereof about a vertical line as an axis, would be an error in direction, or train, and a means whereby such gun, searchlight, or other apparatus may be trained in the proper direction has already been described hereinbefore.

Likewise, in order to make clear the method of operation of the directorscope herein described, the various steps or operations comprising said method of operation of the system, such as the functions of the pointer, trainer, cross-leveler, and the operation of handwheels 47 and 117, have been described in sequence, or successively, but it should be understood that all of these operations may be performed simultaneously, if so desired, thus insuring the proper control of the guns, searchlights, or other apparatus, whose motions it may be desired to control by means of the directorscope at all times.

It should be noted also that, while in the foregoing descriptions reference has frequently been made to the guns whose fire it is desired to control by means of the directorscope, said directorscope might well be used for the purpose of controlling the aiming or firing of one gun as well as of a battery of guns, and also that the novel mechanisms and methods described herein for the errors due to the motions of the structure upon which said gun or guns may be mounted, may readily be embodied in the sighting mechanism of each of said gun or guns, instead of being embodied in a separate instrument such as a directorscope.

Finally, while in the foregoing description of the construction and method of operation of the directorscope reference has frequently been made to the structure upon which said directorscope and the gun or guns whose fire it is desired to control thereby, it should be understood that said directorscope or other instrument or device in which the novel features or mechanisms of the present invention are embodied, as well as the aforesaid gun or guns, searchlights or other device, may well be mounted or installed on the ground or on suitable emplacements, without impairing the usefulness of the present invention, provided the axis of train of said directorscope or other device in which the novel features of the present invention are embodied, remains parallel to the axes of train of the guns, searchlights, or other apparatus or device whose motions it is desired to control thereby.

As many changes could be made in the structure above described without departing from the scope of the invention, it is intended that all matter herein illustrated and described is to be construed as illustrative and not in limiting the sense.

Without further analysis the foregoing will so fully reveal the gist of this invention that others can by applying current knowledge readily adapt it for various applications without omitting certain features that from the standpoint of the prior art fairly constitute the essential characteristics of the generic and specific aspects of this invention, and therefore such adaptations should and are intended to be comprehended within the meaning and range of equivalency of the following claims.

What I claim is:—

1. In an apparatus of the character described, in combination, a pointer's telescope, a trainer's telescope and a cross-leveler's telescope and means associated with said telescopes whereby they mutually cooperate for correcting the error in the sighting of one or more guns.

2. In an apparatus of the character described, in combination, a pointer's telescope, a trainer's telescope and a cross-leveler's telescope, means associated with said telescopes whereby they mutually cooperate for correcting the error in the sighting of one or more guns due to inclination of roller path.

3. In an apparatus of the character described, in combination, a pointer's telescope, a trainer's telescope and a cross-leveler's telescope, means associated with said telescopes whereby they mutually cooperate for correcting the error in the sighting of one or more guns due to the roll or pitch of the ship.

4. In an apparatus of the character described, in combination, a pointer's telescope, a trainer's telescope, and a cross-leveler's telescope, means associated with said telescopes whereby they mutually cooperate for correcting the error in the sighting of one or more guns due to the inclination of the trunnions of the guns or roll or pitch of the ship.

5. In an apparatus of the character described, in combination, a pointer's sighting means, a trainer's sighting means and a cross-leveler's sighting means, means for actuating said several sighting means for keeping the same on the target and horizon respectively and means for rotating all of said sighting means about a vertical axis.

6. In an apparatus of the character described, in combination, a pointer's sighting means, a trainer's sighting means and a cross-eleveler's sighting means, means for actuating said several sighting means for keeping the same on the target and horizon respectively and means for rotating all of said sighting means about a horizontal axis.

7. In an apparatus of the character described, in combination, a pointer's sighting means, a trainer's sighting means and a cross-leveler's sighting means, means for actuating said several sighting means for keeping the same on the target and horizon respectively and means whereby all of said sighting means may be rotated about a common vertical axis and parallel horizontal axes.

8. In an apparatus of the character described, in combination, a pointer's sighting means, a trainer's sighting means and a cross-leveler's sighting means, means for actuating said several sighting means for keeping the same on the target and horizon respectively, means whereby all of said sighting means may be rotated about a common vertical axis and parallel horizontal axes, the means for rotating about the horizontal axes being under the control of the sight setter and cross leveler, respectively.

9. In an apparatus of the character described, in combination, a pointer's sighting means, a trainer's sighting means and a cross-leveler's sighting means is maintained in a horizontal plane, each of said sighting means including a vertically disposed part and means cooperating with each whereby said parts are maintained substantially parallel at all times.

10. In an apparatus of the character described, in combination, a pointer's sighting means, a trainer's sighting means and a cross-leveler's sighting means is maintained in a horizontal plane, each of said sighting means including a vertically disposed part, and means for independently rotating the sighting means to compensate for deflection the lines of sight being rotatable about a vertical axis to compensate for deflection which must be applied to guns.

11. In an apparatus of the character described, in combination, pointer's sighting means, trainer's sighting means and cross-leveler's sighting means and means actuated by said cross leveler's means for overcoming the error introduced in the training of the guns due to inclination of the gun trunnions.

12. In an apparatus of the character described, in combination, pointer's sighting means, trainer's sighting means and cross-leveler's sighting means, and means incorporated in first mentioned means for overcoming the error introduced in the elevation of the guns due to inclination of the gun trunnions, said means including a reflecting element and means for moving said element through an angle equal to one-half the angle of error.

13. In an apparatus of the character described, in combination, a pointer's telescope, a trainer's telescope, a reflector associated with each and means for introducing the correction of error in the elevation of a gun due to tilt of its trunnions, said means being connected with said reflector whereby the reflector is turned through an angle equal to one-half the angle of error.

14. In an apparatus of the character described, in combination, a pointer's sighting means, a trainer's sighting means, a reflector associated with each, means for moving said reflector through an angle equal to one-half the angle of error in elevation due to tilt of the gun trunnions, a firing circuit and means for automatically closing the firing circuit and automatically shifting the point at which the circuit is closed through the angle of error.

15. In an apparatus of the character described, in combination, a pointer's telescope, a trainer's telescope, a cross-leveler's telescope, reflecting means associated with each, control means for each and means for turning the reflecting means of the first two for the purpose of correcting the angle of error due to roll and pitch of the ship, a firing circuit adapted to be automatically closed when the gun is on the target and means associated with the said cross-leveler's means and the trainer's means for shifting, through the angle of error, the point at which the circuit is closed.

16. In a sighting apparatus of the character described, in combination, a pointer's sighting means, trainer's sighting means, cross-leveling means cooperating therewith and means including a rotatable reflector associated with each of the two first-mentioned means for correcting the angle of error in train due to inclination of the axes of train or of the trunnions of the guns.

17. In a sighting apparatus of the character described, in combination, a pointer's sighting means, trainer's sighting means, cross-leveling means cooperating therewith, means including a rotatable reflector associated with the pointer's sighting means for correcting the angle of error in train due to inclination of the axes of train or of the trunnions of the guns, and means whereby said reflecting means may be rotated about a vertical axis.

18. In a sighting apparatus of the character described, in combination, a pointer's sighting means, trainer's sighting means and cross-leveling means and a reflector associated with said trainer's sighting means for correcting errors in train due to inclination of the roller path.

19. In a sighting apparatus of the character described, in combination, a pointer's sighting means, trainer's sighting means and cross-leveling means, all of said means being rotatable about a common vertical axis and means for adjusting the pointer's sighting means for desired gun elevation.

20. In a sighting apparatus of the character described, in combination, pointer's sighting means, trainer's sighting means, a cross-leveling means, a firing circuit associated with one of said means adapted to be closed when the gun is at the desired elevation, and means whereby the setting of said firing circuit for proper gun elevation automatically causes proper correction to be applied to the pointer's and trainer's sights.

21. In a sighting apparatus of the character described, in combination, pointer's sighting means, trainer's sighting means, a cross leveling means, and transmitters associated with said pointer's and trainer's sighting means and connected therewith through said cross-leveling means whereby the line of sight of the pointer's sight remains in the same vertical plane as the axis of the bore of the gun or in a plane parallel thereto.

22. In a sighting apparatus of the character described, in combination, a pointer's sighting means, trainer's sighting means, a cross-leveling means, means whereby the elevation of the lines of sight of the pointer and trainer's sighting means is automatically altered to compensate for the change in elevation of the gun due to inclination to the trunnions thereof, a firing circuit associated with one of said means adapted to be closed when the axis of the bore of the gun has the desired angular relation to the horizontal or to the line of sight to the target and gyro means for closing the firing circuit when the gun has proper elevation and when correction for error in elevation has been applied regardless of the inclination of the trunnion of the gun.

23. In a sighting apparatus of the character described, in combination, a pointer's sighting means, trainer's sighting means, a cross-leveling means, means whereby the elevation of the lines of sight of the pointer and trainer's sighting means is automatically altered to compensate for the change in elevation of the gun due to inclination to the trunnions thereof, a firing circuit associated with one of said means, transmitters cooperating with said pointer's and trainer's sighting means and means whereby said firing circuit is automatically closed when the axis of the bore of the gun has the desired angular relation to the line of sight to the target regardless of the inclination of the trunnion of the gun.

Signed at Washington, District of Columbia, this 20th day of April, 1920.

LAWRENCE RADFORD.